July 11, 1950     B. LIEBOWITZ     2,514,959
CUTTING AND GAUGING APPARATUS
Filed March 19, 1949     3 Sheets-Sheet 1

INVENTOR.
BENJAMIN LIEBOWITZ
BY

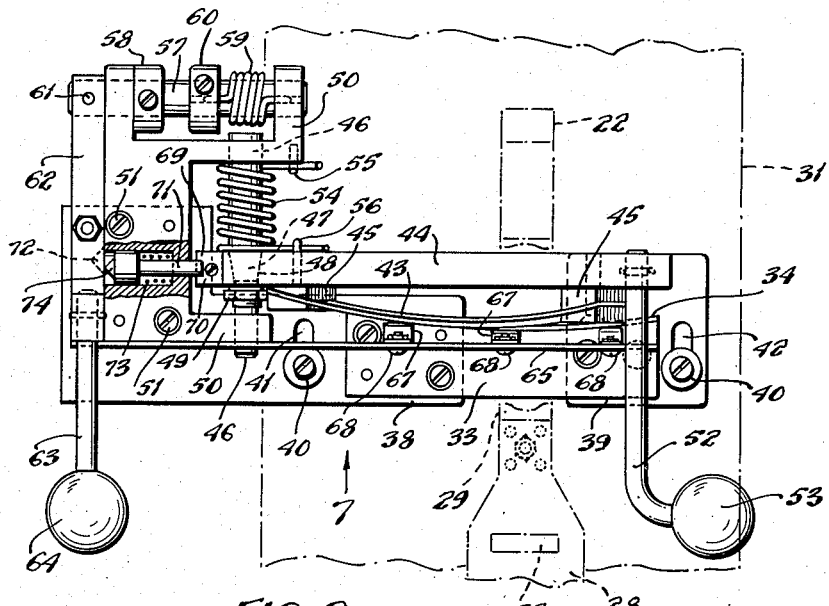

July 11, 1950 B. LIEBOWITZ 2,514,959
CUTTING AND GAUGING APPARATUS
Filed March 19, 1949 3 Sheets-Sheet 3
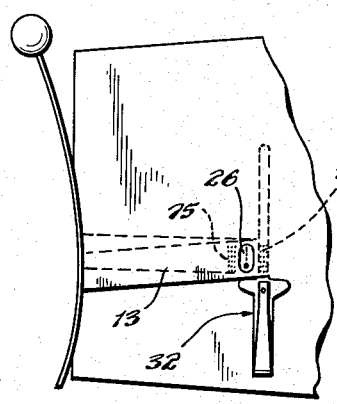
FIG. 14.
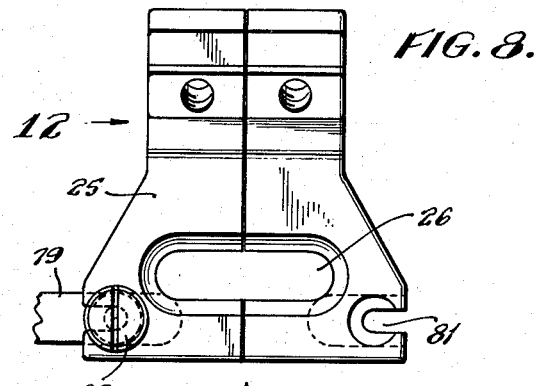
FIG. 8.
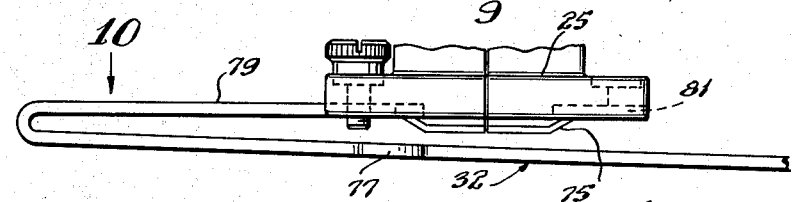
FIG. 9.
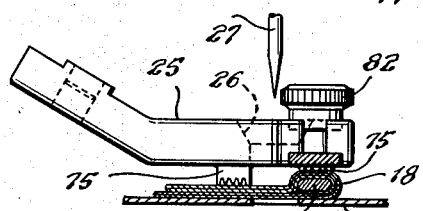
FIG. 12.
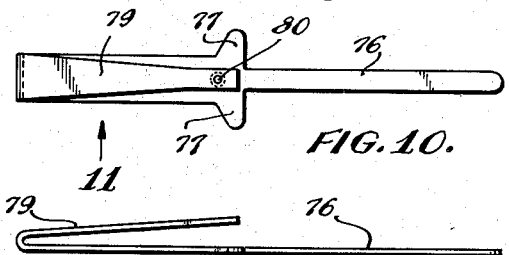
FIG. 10.
FIG. 11.
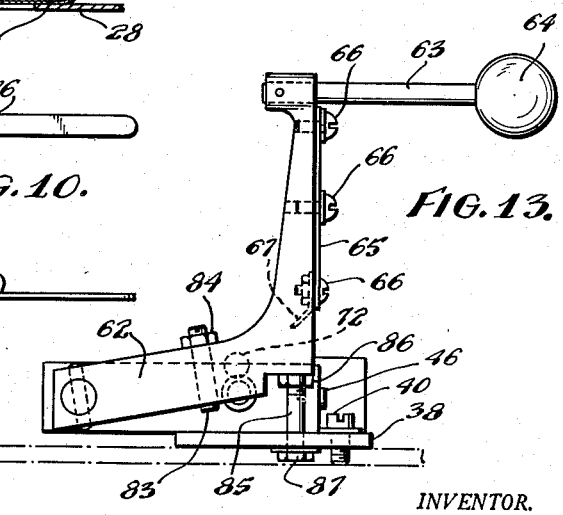
FIG. 13.
INVENTOR.
BENJAMIN LIEBOWITZ
BY Patented July 11, 1950

2,514,959

UNITED STATES PATENT OFFICE 2,514,959

CUTTING AND GAUGING APPARATUS

Benjamin Liebowitz, Lewisboro, N. Y.

Application March 19, 1949, Serial No. 82,434

19 Claims. (Cl. 112—130)

This invention relates to apparatus and methods for the manufacture of facings of garment parts and has particular reference to facings for sleeves and men's and boys' shirts. A type of facing to which the present invention is particularly applicable is that shown in my U. S. Patent No. 2,477,813, issused on August 2, 1949. This application is a continuation-in-part of application Serial No. 783,044, filed October 30, 1947, which now stands abandoned.

As currently made by most shirt manufacturers, sleeve facings involve labor costs which are large in proportion to the intrinsic importance of that particular part of the garment. On account of this high cost of the conventional type of sleeve facings, some manufacturers have adopted a simplified form of facing which has the disadvantage either of an unsatisfactory appearance, or of relatively large cloth consumption.

An object of this invention is to provide apparatus and methods for manufacturing a simplified facing which is entirely satisfactory in appearance, neatness and strength, which requires a minimum yardage, and which at the same time can be manufactured at a low cost.

A further object of my invention is to provide a novel and simple mechanism applicable to existing types of sewing machines to facilitate attachment of facings to sleeves.

Another object of my invention is to provide a mechanism of this character that is simple and effective in operation, and efficient for the purposes intended.

Still another object of my present invention is to provide a novel method of applying facings that will reduce manufacturing costs considerably over those now extant.

Other objects and novel features of the invention will appear in the following description and accompanying drawings wherein:

Fig. 6 is a plan view of the device shown in Figure 5 showing certain parts of the device in greater detail, seen in direction of arrow 6 on Figure 5;

Fig. 7 is a front elevation of the device shown in Figures 5 and 6 seen in direction of arrow 7 on Figure 6;

Fig. 8 is a plan view of a modified presser foot used in connection with the device shown in Figures 5 to 7;

Fig. 9 is a front elevation of the presser foot shown in Figure 8, seen in direction of arrow 9 of Figure 8, with my new gauging device attached thereto, in non-operating position;

Fig. 10 is a plan view of the gauging device shown in Figure 9, seen in direction of arrow 10 on Figure 9;

Fig. 11 is a front elevation of the gauging device shown in Figure 10, seen in direction of arrow 11 on Figure 10;

Fig. 12 is a side view of the presser foot, seen in direction of arrow 12 on Figure 8 showing the gauging device in cross-section and the sleeve in place, in operating position;

Fig. 13 is a fragmentary side elevation of the device shown in Figures 5 to 7, and shows certain parts of the device in greater detail; and Fig. 14 is a diagrammatic plan view showing the gauging device located with respect to the presser foot and showing the sleeve in position ready to have the cutting and stitching operations performed.

Figure 1:
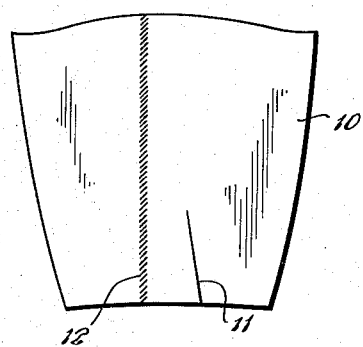
Fig. 1 is a plan view of a piece of fabric cut to form a sleeve and having a slit or vent which is to be faced.

The main parts of my new device may be made as an attachment to a conventional type of sewing machine, e. g., a bar tacker. The sewing machine shown in the attached drawings is of such conventional type, and therefore, the conventional sewing machine parts are indicated in the drawings only insofar as is necessary for the understanding of the functioning of my new gauging and cutting device.

Referring now to the drawings, a sleeve facing which is particularly adaptable to my method and apparatus is shown in Figures 1, 2, 3 and 4.

Figure 1 shows a piece of fabric 10 cut to form a sleeve of a shirt. This sleeve is slit to form the usual vent 11. In a preferred embodiment, this slit is a straight line cut so as to form a small angle with the stripes of the sleeve which are schematically indicated at 12.

Figure 2:
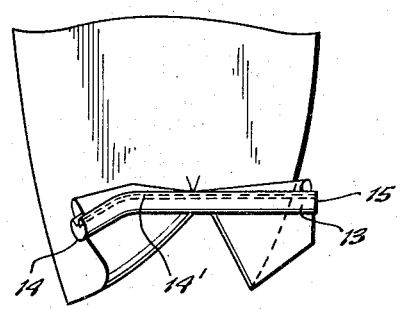
Fig. 2 is a perspective view showing the facing strip attached to the vent of the sleeve shown in Figure 1.

The sleeeve facing itself is shown at 13 in Figure 2 after it has been sewn to the vent 11. This facing 13 is in the form of a strip and is preferably of the type known as a "continuous facing." It comprises a strip which is cut about say 1 to 2 inches wide, and which is folded double longitudinally, and then has the cut edges turned in so as to leave no raw edges when the turned in edges are seamed to the sides of the vent 11.

Figure 2 shows the sleeve facing 13 stretched out and attached to the sleeve by means of the stitching 14'.

Except for the angle of the slit 11, the facing arrangement shown in Figures 1 and 2 represents conventional practice for certain types of garments and need not be described in further detail since it is well-known to those familiar with the art of shirt-making. The method and apparatus here disclosed are fully applicable to such conventional facings.

The length of the facing strip 13 is somewhat in excess of twice the length of the slit 11. Since it is not feasible to control this length to a high degree of precision, it is usual to cut the strip 13 slightly longer than is needed, so that it has end portions projecting beyond the sleeve as shown at 14 and 15.

Figure 3:
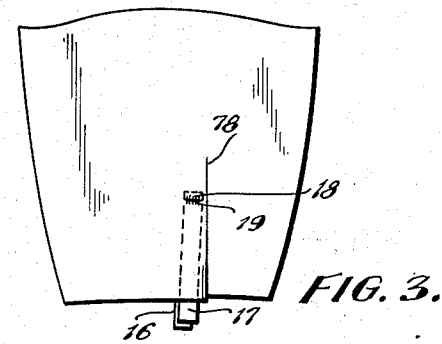
Fig. 3 is a plan view of a completed sleeve facing before the cuff is attached.

In order to bring the facing 13 from its open position shown in Figure 2 into the final folded position shown in Figure 3, the facing is bent transversely at its center so as to form two legs 16 and 17. 17 becomes the upper leg which is left more or less in the position shown in Figure 2 with respect to the sleeve 10, i. e. turned under the sleeve so as to be hidden from view. 16 is the lower leg which is straightened out so as to extend under the upper leg 17. The final result is shown in Figure 3, in which two legs 16 and 17 are positioned more or less superimposed after they have been folded transversely at the crotch 18.

To complete the stitching and permanently hold the facing in the position shown in Figure 3, stitching 19 is placed at or near the crotch 18. This stitching 19 may be in the form of a bar tack. It is preferably made so as to pass through the sleeve 10, and the upper and lower legs 16 and 17 of the facing strip 13 very near the crotch 18.

Figure 4:
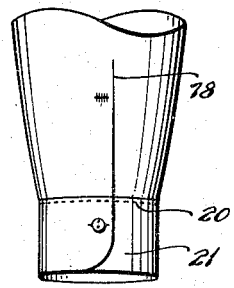
Fig. 4 is a plan view of the sleeve shown in Figures 1 to 3 with the cuff attached.

The lower ends 14 and 15 of the facing 13 are permanently held in the position shown in Figure 3 by the cuff stitching portion 20 by means of which the cuff 21 is attached to the sleeve as shown in Figure 4.

One of the essential operations in the manufacture of sleeve facings is the trimming of the cuff end of the sleeve so as to trim off the end portions 14 and 15 of the facing strip 13 and so as to even out any slight inequalities in the length of the sleeve parts adjacent the facing strip 13. After this trimming operation the cuff 21 may be attached at any point in the subsequent sequence of operations on the sleeve.

The lower end of the completed sleeve with the cuff attached is shown in Figure 4 where the cuff is indicated at 21. It will be noticed that all parts of the facing 13 itself are substantially hidden from view and are kept permanently in folded position by the bar tack 19 and by the cuff stitching 20 at the cuff end.

If produced by ordinary methods, the facing 13 shown in Figures 1 to 4 inclusive would require two separate operations:

(1) Folding the facing in proper position, including adjustment of the legs 16 and 17 to even length and applying the stitching 19; and (2) Trimming off of the protruding end portions 14 and 15 of the facing, evening up at the same time any unevenness at the bottom of the sleeve and trimming the ends of loose threads.

A substantial part of the time in each of these operations in the handling time, viz., the picking up of the sleeve, adjusting it for the operation, and restacking after the operation is performed. It would obviously be more economical to perform the operations mentioned above in a single handling, and in particular to perform the trimming operation essentially while the stitching operation is in progress. To accomplish this result, however, involves several problems including a double gauging of the work, viz., gauging of the sleeve so as to place the stitching 19 in proper position, and at the same time gauging it so as to properly trim the end of the sleeve, and to remove the protruding end portions 14 and 15 of the facing strip 13, with due regard to inevitable variations in length of vent arising from manufacturing operations up to this point.

It is, therefore, a primary object of this invention to provide a machine which will perform both of the above mentioned operations as a single operation, which will provide double gauging means for accomplishing this end, and which will provide a maximum of speed and simplicity in the handling of the garment parts in the process.

Figure 5:
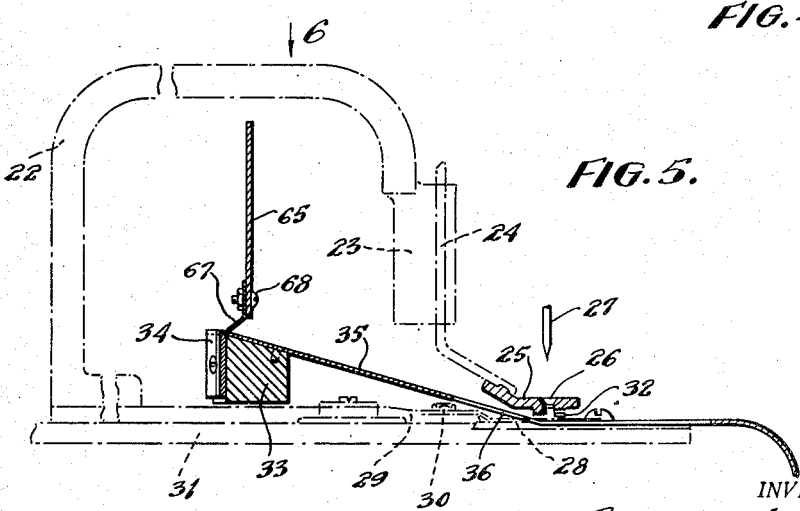
Fig. 5 is a side elevation partly in cross-section showing the principal elements of my new device in association with a sewing machine.

Figure 5 shows in dotted line certain parts of a conventional tacking machine. Shown by solid lines, partly in cross-section, are essential parts of my attachment. The dotted part 22 represents an arm of the sewing machine which carries parts necessary for clamping the work in operating position, and to which are imparted the motions necessary for the formation of the tack.

In the housing 23 of arm 22, is arranged a vertical slider 24 which is pressed downward by a spring mechanism not shown, and which can be raised by conventional knee-left or foot-lift means which are also not shown in the drawings. Carried on the lower end of the slider 24 is the clamp or presser foot 25 which has a slot 26 through which the needle 27 operates. This presser foot 25 is especially designed for use in connection with my apparatus.

The presser foot or clamp 25, when in lowered position, holds the work to be sewn firmly between it and a clamp plate 28 shown in dotted lines. This clamp plate 28, being required to move in unison with the arm 22, is fastened at 30 to a bar 29 which is solidly connected to the arm 22 at its rear end and rests on the bed 31 of the machine as shown in dotted lines in Figure 5.

It will be understood that all the parts so far described (with the exception of the presser foot 25) are standard parts of a conventional tacking machine.

My new attachment itself comprises the specially designed presser foot 25 mentioned above, a gauging member 32 which is carried by the presser foot 25, and a supporting member 33 which is mounted on the bed 31 of the machine so as to bridge over the bar 29 and leave clearance for its motion.

The supporting member 33 carries a stationary curved cutting blade 34 on its rear face. A bent supporting plate 35 with opening 36 is mounted partly on member 33 and covers all exposed parts. Thus it provides a suitable smooth platform on which the sleeve end can be laid flat for sewing. The supporting member 33 is adjustable forwards and backwards, towards and away from the presser foot 25 so as to adjust the distance from the gauging edge of the gauging member 32 to the cutting edge of the cutting blade 34. In this way the amount of material to be cut off in the trimming operation is adjusted.

Essentially, then, a preferred embodiment of my invention comprises a gauging member 32 which is elastically mounted on the presser foot 25 and is adapted for gauging the work by using the crotch as the take-off point as will be more fully described hereinafter, and a cutting blade 34 which is adapted to trim the end of the sleeve at a predetermined distance from said gauging member 32.

As shown in Figure 6, the clamp plate 28 is conventionally mounted on bar 29 and is provided with a slot 37 to allow the needle 27 to go through. This bar 29 carries the arm 22 as shown in dotted lines in Figures 5 and 6. The supporting member 33 is mounted on the bed of the machine so as to clear the bar 29 by means of plates 38 and 39, which in turn are fastened to the bed of the machine by screws and washers shown at 40.

The plate 38 is slotted as shown at 41, and the plate 39 is slotted as shown at 42 in order to provide longitudinal adjustment of the whole mechanism, that is to say, in order to permit adjustment of the distance between the gauging member 32 and the cutting edge of the cutting blade 34. Cooperating with the stationary cutting blade 34 is the movable cutting blade 43 which is clamped to the arm 44 by means of wedge-shaped members 45 in order to impart a curvature to the movable blade 43 corresponding to the curvature of the stationary cutting blade 34. This curvature is desirable in order to allow the cutting blade to "bite into" the sleeve proper, as shown in Figure 14, wherever that should be necessary without necessitating the trimming of the whole length of the bottom of the sleeve.

The arm 44 which carries the movable cutting blade 43 is pivoted by means of a spindle 46 having a tapered portion 47 which fits into a correspondingly tapered hole 48 in the arm 44. The tapered members 47 and 48 are assembled under pressure by means of the nut 49 which works on a screw on the spindle 46. The ends of the spindle 46 ride in bearings in a block 50 which is bolted to the plate 38 by means of the screws 51. The holes in the block 50 which receive the screws 51 may have clearance so that the block 50 will have some freedom for adjustment.

As the position of the movable blade 43 is determined by the position of the blade arm 44 and since the position of the blade arm 44 is determined, through the intermediary of the spindle 46, by the position of the block 50, it will readily be seen that allowing the block 50 to have some freedom before clamping it down enables the position of the movable blade 43 to be adjusted relative to the fixed blade 34.

The normal or non-operating position of the blade arm 44 is upward, as shown in Figure 7. To trim, the blade arm 44 is brought down by means of the handle 52 comprising knob 53, so as to make the movable and the fixed cutting blades co-act to trim. In order to restore the arm 44 to its upward non-operating position, a torsion spring 54 may be used as shown in Figure 6, said spring bearing transversely against a pin 55 mounted in the block 50, and a pin 56 mounted in the blade arm 44. It will be understood that spring 54 also acts by longitudinal pressure to urge the movable blade 43 toward the fixed blade 34.

In machines of the kind involved here it is very desirable and, in fact, necessary to provide adequate safeguards so that the machine operator will be unable to injure himself by inadvertent operation of the movable cutting blade 43. Furthermore, for a cutting action of the type involved here, it is practically necessary to clamp the work very close to the stationary cutting blade 34 in order that the work shall not shift during the cutting process. In order to attain these objects I provide combined clamping and safety means, as will be described below.

The block 50 carries at its rear end a transverse shaft 57 which is held in position by a collar 58 and elastically urged both laterally and rotationally by the torsion spring 59 co-acting with a collar 60, also carried on the shaft 57. Pinned at 61 on the extending end of the shaft 57 is a crank arm 62 which is manually operated by means of an extension 63 carrying a knob 64. Fastened to the forward edge of the crank arm 62 is a guard plate 65 (see Figures 5, 6, 7 and 13) by means of the screws 66. The lower portion of the guard plate 65 has mounted on it elastic fingers 67 adjustably held on the plate 65 by means of screws 68.

Instead of using spaced fingers 67 as shown, I may use a continuous "comb" of relatively thin spring bronze, or a continuous strip of rubber of suitable cross-section and hardness.

Figure 5 shows the relative position of the guard plate 65 and the elastic fingers 67 with reference to the stationary cutting edge 34 when the plate 65 is in the "down" or clamping position. The distance between the lower edge of the guard plate 65 and the surface of the slanting supporting plate 35 is then such that an operative can not easily get his fingers therebetween. Hence, when the guard plate 65 is in the down or operating position, the operative's fingers are kept from access to the cutting edge. At the same time the work is clamped by the elastic fingers 67. It is to be noted that the operative must lower the guard plate 65 manually here, and must hold the plate in this position, otherwise it would immediately be raised again by the torsion spring 59.

The safety device incorporated in this attachment is such as to prevent the lowering of the movable cutting blade 43 unless the guard plate 65 is held down by the operative's left hand. In the "up" or non-operating position, the movable blade arm 44 is blocked against movement by means of an extension shown at 69 which may carry a hardened member 70 which will abut against a pin 71.

So long as the pin 71 protrudes as shown in Figures 6 and 7, the arm 44 can not be lowered. When, however, the crank arm 62 which carries the guard plate 65 and the elastic fingers 67 is lowered, a recess 72 in the arm 62 comes opposite pin 71 and permits the spring 73 to push the pin 71 to the left, thereby withdrawing this pin so as to allow the extension 69 to pass and hence allow lowering of the blade arm 44.

The recess 72 is tapered so as to cooperate with the tapered nose 74 on the pin 71 so that, in course of normal operation, raising of the arm 62 will immediately push the pin 71 into blocking position, preventing downward movement of the movable arm 44.

Once the blade arm 44 has been lowered from its "up" or non-operating into operative position, the pin 71 is prevented from moving to the right of the curved end of the extension 69; hence the tapered nose 74 of the pin 71 would be kept in the tapered recess 72 if the operative released the knob 64 at any time after the blade arm 44 began its downward stroke. In other words, once the blade 43 has begun its downward stroke the guard plate 65 is held in its downward or safety position by the mechanism shown so that the operative could not get his fingers in the cutting region. However, when the downward stroke of the blade arm 44 has been completed and said arm is released, then after it reaches its upward non-operating position, the crank arm 62 can be raised and move the pin 71 into its blocking position, since the curved end of extension 69 is then no longer in position to block movement of pin 71.

In the following I will describe my new method and means of gauging the sleeve so as to make the tack and trim the bottom ends of the sleeve in proper relationship to each other, and to the other parts of the sleeve. One of the significant factors in this connection is that the effective length of the finished vent must not be less than something like 5½ inches in order to permit opening of the cuff for ironing, but the total length of finished vent determines the amount of material which must be used in the strip forming the facing. This point is more important than appears on the surface because these facing strips, if not too long, can be taken out of certain places in the spread which would otherwise be waste, e. g. armholes, but the length of the strip must be restricted in order to effect such economies in cutting. Hence the stitching 19 shown in Figures 3 and 4 must be as close as possible to the crotch 18, as the distance from the stitching 19 to the crotch 18 represents added strip material which is useless as far as the garment is concerned.

Another problem which must be faced in this connection is that the sleeve must be easily and quickly applicable to the machine and to the gauging means so that there will be no unnecessary loss of production time in inserting the work into the machine.

Still another problem is to permit quick and easy change-over from right to left sleeve and vice versa. To solve these problems I have developed the means and methods for gauging shown in Figures 8 to 14.

Reference to Figure 14 will make clear the form of the gauging means and its relationship to the clamp or presser foot 25. In this figure, the gauging member is shown at 32, the opening in the presser foot 25 is shown at 26, and the teeth of the presser foot are schematically indicated by the short-dashed lines 75.

Figures 10 and 11 are a plan view and a side elevation, respectively, of the gauging member 32. It will be noted that it consists of a relatively long, thin and narrow tongue 76 which is shown in cross-section to an enlarged scale in Figure 12. In practice this tongue may be, say ⅛" wide and $\frac{1}{32}$ to $\frac{1}{16}$" thick. This long tongue is inserted into the vent 11 by sliding the sleeve, which has previously been folded into proper position as shown in Figure 3, over it. The sleeve is then pulled toward the tongue 76 so that the crotch 18 abuts against the tongue 76, which thereby determines the longitudinal position of the entire sleeve relative to the needle and to the cutting edge (see Figure 12).

To determine the lateral position of the sleeve, the gauging member 32 is provided with wings 77. After the tongue 76 is inserted into the vent 11 and after the sleeve is pulled against the tongue, the entire sleeve is pushed on the tongue until the edge of the facing 13 contacts the wings 77, as shown in Figure 14.

However, it is to be noted that the sleeve itself can be folded over wings 77 so as to form a small pleat in the sleeve as indicated at 78 in Figure 4.

The gauging member 32 is bent over on itself to form a hairpin-like spring shown at 79. At the end of the spring 79 is a threaded hole 80 by means of which the gauging member 32 is fastened to the presser foot 25. Proper location of the gauging member 32 with respect to the presser foot 25 is effected by means of a slot shown at 81 in Figures 8 and 9 into which the end of the spring part 79 fits snugly. The screw 82 holds the gauging member 32 in its position. It is made so that it can be readily changed from one side of the presser foot to the other to take care of right and left sleeves. Even though the gauging member is made thin still it occupies appreciable thickness, and hence the teeth on the presser foot 25 are at different levels in the front and rear as shown in Figure 12.

When the vent 11 is pushed over the tongue 76 and slid to the left so as to contact the wings 77 it must also pass under the presser foot 25. This operation of inserting is performed, of course, when the presser foot is raised. In this position the tongue 76 must, therefore, be free of the presser foot as shown in Figure 9; on the other hand, the presser foot 25 must press firmly on the work when it is in the lowered or operating position. For this reason the gauging member 32 incorporates the above described spring part 79 in order to permit the different positions required of the tongue 76 relative to the teeth 75 of the presser foot 25.

After the stitching operation is performed, it will be seen that the whole sleeve can be slid off the gauging member 32 when the presser foot 25 is raised again. In other words, the gauging means are constructed so as not to sew the sleeve to the gauge.

After the crotch 18 has been pulled against the tongue 76 and pushed over to contact the wings 77, the ends of the sleeve are straightened out so as to extend up to or beyond the cutting edge of the blade 34. During this operation the guard plate 65 and the elastic fingers 67 are in the raised position shown in Figure 7. When the ends of the sleeve have been properly set with respect to the cutting blade 34, the arm 62 is lowered into its clamping position. This moves the elastic fingers 67 into contact with the work close to the cutting edge, as indicated in Figure 5, and likewise prevents access of the operative's fingers to the cutting edge. This operation also allows the blocking pin 71 to be withdrawn so that as soon as the arm 62 is lowered to the operating position the operative may lower the blade arm 44 so as to trim the ends of the sleeve. Moreover, as soon as the guard plate 65 is lowered to clamping position, the operative can press the starting pedal of the tacking machine so as to start the stitching operation to make the stitching 19. Thus, the operation of trimming the sleeves is performed substantially while the sewing operation is going on or so quickly before the start of sewing as to involve no appreciable loss of time.

Motions of the crank arm 62 and blade arm 44 should be suitably limited both for downward and upward position. Figure 13 shows an adjusting screw 83 locked by nut 84 which adjustably limits the lower position of the arm 62. The upper position of arm 62 is limited by a bolt 85 which is threaded into the arm 62 and locked by nut 86. This bolt 85 passes through a clear opening in the plate 38 and has a head and washer 87 which prevents the bolt from passing through said opening. By this means the upward position of the arm 62 is adjustably limited.

In a similar manner the downward position of the blade arm 44 is limited by an adjustable bolt 88 having clamping nut 89 and head 90. The upward position of the arm 44 is limited by contact between the plate 38 and the extension 69 of arm 44 as shown in Figure 7.

Tacking machines are built with a variety of cam mechanisms and associated parts to make a variety of tacks. The machine illustrated in the accompanying drawings makes a tack consisting simply of a short straight row of stitches in the neighborhood of ½ inch in length, or rather a plurality of such rows superimposed on each other. However, other forms of tack may be preferred by some manufacturers, for example, a small narrow rectangle, or a small triangle. Or, instead of using plain stitches, a form of whip stitch can be used such as is used in buttonholes on shirts and other garments. My invention is not limited to any particular form of tack.

If the sleeve has been subjected to the manufacturing operations to bring it to the state shown in Figure 2, it will be found that there is in general an appreciable variation in the length of the faced vent when it is folded into the position shown in Figure 3. For example, it requires careful manufacture to maintain the length of the faced vent within plus or minus ⅛-inch of its intended length. This, or even greater variation may occur from sleeve to sleeve in the same bundle and is certainly very likely to occur from bundle to bundle in the same lot.

Hence, the distance from the trimming edge of blade 34 to the gauging edge of the gauging member 32 can not be fixed in practice so as to trim all sleeves exactly alike. If a small amount, say ⅛-inch or so, of the protruding ends 14 and 15 of the sleeve facing of Figure 3 is left protruding after the trimming operation, there is no objection. This will occur if the length of vent is ⅛-inch or so shorter than the setting of blade 34. On the other hand, with this same setting, if the vent should happen to be say, ⅛-inch longer then the setting of the blade, then the cutting edges will cut into the sleeve as indicated in Figure 14. So long as the amount of sleeve trimmed away does not appreciably exceed ⅛-inch, it is satisfactory.

If the cutting blades were made straight, it would be much more difficult to trim the sleeve end because then the whole sleeve end would have to be trimmed. By curving the blades as shown, I eliminate the necessity for trimming the entire sleeve end in those cases where the vent comes out to be somewhat longer than is proper for a particular setting of the trimming edges.

What I claim is:

1. In apparatus of the character described comprising a sewing machine having a bed, a presser foot and associated stitching mechanism, in combination, gauging means associated with said presser foot for positioning a portion of a sleeve in proper stitching position; holding means mounted on said bed spaced from and in back of said presser foot for holding an end portion of said sleeve while said first sleeve portion is held by said presser foot in proper stitching position determined by said gauging means; and manually operable cutting means mounted on said bed associated with said holding means for trimming said end portion of said sleeve while held by said holding means.

2. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a carrier member mounted on said machine bed in back of said presser foot and slidably in a horizontal plane in direction approximately parallel to the positioned vent; means for securing said carrier member in adjusted position to said bed; a support mounted on said carrier member for supporting an end portion of said sleeve; a stationary transverse cutting member mounted on said carrier member adjacent to said support and adjustable by movement of said carrier member to make its distance from said gauging means substantially equal to the length of the positioned vent; movable clamping means for clamping said end portion of said sleeve to said support along said open end of said vent, said clamping means mounted on said carrier member movably between releasing position spaced from said support and clamping position pressing said end portion of said sleeve against said support; a movable cutting member for trimming by coaction with said stationary cutting member said end portion of said sleeve, said cutting member mounted on said carrier member movably between non-operative and operative positions; guard means mounted on said movable clamping means movable together with the same so as to prevent access to the cutting edges of said cutting members while said clamping means are in clamping position; first interlocking means permitting movement of said movable cutting member from non-operative into operative position only while said movable clamping means are in clamping position; second interlocking means permitting movement of said movable clamping means for clamping into releasing position only while said movable cutting member is in non-operative position; and spring means combined with said movable cutting member permanently tending to move the same from operative into non-operative position.

3. In apparatus for formng a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a support mounted on said machine bed spaced from and in back of said presser foot at a distance substantially equal to the length of said vent; means for clamping said end portion of said sleeve adjacent said open end of said vent to said support; and cutting means mounted on said machine bed for trimming said end portion of said sleeve at said open end of said vent while held by said clamping means.

4. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said pressure foot; gauging means associated with said presser foot for engaging the crotch of said vent and thus positioning said sleeve with said vent in proper stitching position; a carrier member mounted on said machine bed in back of said presser foot and slidably in a horizontal plane in direction approximately parallel to the positioned vent; means for securing said carrier member in adjusted position to said bed; a support mounted on said carrier member also in back of said presser foot for supporting an end portion of said sleeve; a stationary transverse cutting member mounted on said carrier member adjacent to said support and adjustable by movement of said carrier member to make its distance from said gauging means substantially equal to the length of the positioned vent; movable clamping means for clamping said end portion of said sleeve to said support adjacent said open end of said vent, said clamping means mounted on said carrier member movable between releasing position spaced from said support and clamping position pressing said end portion of said sleeve against said support; a movable cutting member for trimming by co-action with said stationary cutting member said end portion of said sleeve, said cutting member mounted on said carrier member movably between non-operative and operative positions; guard means mounted on said movable clamping means movable together with the same so as to prevent access to the cutting edges of said cutting members while said clamping means are in clamping position; first interlocking means permitting movement of said movable cutting member from non-operative into operative position only while said movable clamping means are in clamping position; and second interlocking means permitting movement of said movable clamping means from clamping into releasing position only while said movable cutting member is in non-operative position.

5. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a carrier member mounted on said machine bed in back of said presser foot and slidably in a horizontal plane in direction approximately parallel to the positioned vent; means for securing said carrier member in adjusted position to said bed; a support mounted on said carrier member also in back of said presser foot for supporting an end portion of said sleeve; a stationary transverse cutting member mounted on said carrier member adjacent to said support and adjustable by movement of said carrier member to make its distance from said gauging means substantially equal to the length of the positioned vent; movable clamping means for clamping said end portion of said sleeve to said support along said open end of said vent, said clamping means mounted on said carrier member movable between releasing position spaced from said support and clamping position pressing said end portion of said sleeve against said support; a movable cutting member for trimming by co-action with said stationary cutting member said end portion of said sleeve, said cutting member mounted on said carrier member movably between non-operative and operative positions; guard means mounted on said movable clamping means movable together with the same so as to prevent access to the cutting edges of said cutting members while said clamping means are in clamping position; and interlocking means permitting movement of said movable cutting member from non-operative into operative position only while said movable clamping means are in clamping position.

6. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a carrier member mounted on said machine bed in back of said presser foot and slidably in a horizontal plane in direction approximately parallel to the positioned vent; means for securing said carrier member in adjusted position to said bed; a support mounted on said carrier member also in back of said presser foot for supporting an end portion of said sleeve; a stationary transverse cutting member mounted on said carrier member adjacent to said support and adjustable by movement of said carrier member to make its distance from said gauging means substantially equal to the length of the positioned vent; movable clamping means for clamping said end portion of said sleeve to said support adjacent said open end of said vent, said clamping means mounted on said carrier member movable between releasing position spaced from said support and clamping position pressing said end portion of said sleeve against said support; a movable cutting member for trimming by co-action with said stationary cutting member said end portion of said sleeve, said cutting member mounted on said carrier member movably between non-operative and operative positions; guard means mounted on said movable clamping means movable together with the same so as to prevent access to the cutting edges of said cutting members while said clamping means are in clamping position; and interlocking means permitting movement of said movable clamping means from clamping into releasing position only while said movable cutting member is in non-operative position.

7. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a carrier member mounted on said machine bed in back of said presser foot and slidably in a horizontal plane in direction approximately parallel to the positioned vent; means for securing said carrier member in adjusted position to said bed; a support mounted on said carrier member also in back of said presser foot for supporting an end portion of said sleeve; a stationary transverse cutting member mounted on said carrier member adjacent to said support and adjustable by movement of said carrier member to make its distance from said gauging means substantially equal to the length of the positioned vent; movable clamping means for clamping said end portion of said sleeve to said support along said open end of said vent, said clamping means mounted on said carrier member movable between releasing position spaced from said support and clamping position pressing said end portion of said sleeve against said support; a movable cutting member for trimming by coaction with said stationary cutting member said end portion of said sleeve, said cutting member mounted on said carrier member movably between non-operative and operative positions; and guard means mounted on said movable clamping means movable together with the same so as to prevent access to the cutting edges of said cutting members while said clamping means are in clamping position.

8. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a carrier member mounted on said machine bed in back of said presser foot and slidably in a horizontal plane in direction approximately parallel to the positioned vent; means for securing said carrier member in adjusted position to said bed; a support mounted on said carrier member also in back of said presser foot for supporting an end portion of said sleeve; a stationary transverse cutting member mounted on said carrier member adjacent to said support and adjustable by movement of said carrier member to make its distance from said gauging means substantially equal to the length of the positioned vent; movable clamping means for clamping said end portion of said sleeve to said support adjacent said open end of said vent, said clamping means mounted on said carrier member movable between releasing position spaced from said support and clamping position pressing said end portion of said sleeve against said support; and a movable cutting member for trimming by coaction with said stationary cutting member said end portion of said sleeve, said cutting member mounted on said carrier member movably between non-operative and operative positions.

9. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a support mounted on said machine bed in back of said presser foot for supporting an end portion of said sleeve; a stationary transverse cutting member mounted on said machine bed adjacent to said support; movable clamping means for clamping said end portion of said sleeve to said support along said open end of said vent, said clamping means mounted on said machine bed movably between releasing position spaced from said support and clamping position pressing said end portion of said sleeve against said support; a movable cutting member for trimming by coaction with said stationary cutting member said end portion of said sleeve, said cutting member mounted on said machine bed movably between non-operative and operative positions; guard means mounted on said movable clamping means movable together with the same so as to prevent access to the cutting edges of said cutting members while said clamping means are in clamping position; first interlocking means permitting movement of said movable cutting member from non-operative into operative position only while said movable clamping means are in clamping position; second interlocking means permitting movement of said movable clamping means from clamping into releasing position only while said movable cutting member is in non-operative position; and spring means combined with said movable cutting member permanently tending to move the same from operative into non-operative position.

10. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a support mounted on said machine bed in back of said presser foot for supporting an end portion of said sleeve; a stationary transverse cutting member mounted on said machine bed adjacent to said support; movable clamping means for clamping said end portion of said sleeve to said support adjacent said open end of said vent, said clamping means mounted on said machine bed movably between releasing position spaced from said support and clamping position pressing said end portion of said sleeve against said support; a movable cuttting member for trimming by coaction with said stationary cutting member said end portion of said sleeve, said cutting member mounted on said machine bed movably between non-operative and operative positions; guard means mounted on said movable clamping means movable together with the same so as to prevent access to the cutting edges of said cutting members while said clamping means are in clamping position; first interlocking means permitting movement of said movable cutting member from non-operative into operative position only while said movable clamping means are in clamping position; and second interlocking means permitting movement of said movable clamping means from clamping into releasing position only while said movable cutting member is in non-operative position.

11. In apparatus for forming a tack by stitching near the crotch of the vent of a sleeve and trimming the end portion of said sleeve at the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a support mounted on said machine bed in back of said presser foot for supporting an end portion of said sleeve; a stationary transverse cutting member mounted on said machine bed adjacent to said support; movable clamping means for clamping said end portion of said sleeve to said support adjacent said open end of said vent, said clamping means mounted on said machine bed movably between releasing position spaced from said support and clamping position pressing said end portion of said sleeve against said support; a movable cutting member for trimming by co-action with said stationary cutting member said end portion of said sleeve, said cutting member mounted on said machine bed movably between non-operative and operative positions; and guard means mounted on said movable clamping means movable together with the same so as to prevent access to the cutting edges of said cutting members while said clamping means are in clamping position.

12. In apparatus for forming a tack by stitching near the crotch of the vent of a sleeve and trimming the end portion of said sleeve along the open end of said vent, in combination, a machine bed; a presser foot mounted for movement parallel to the plane of said bed along a path conforming to the shape of said tack; a stitching mechanism associated with said presser foot; gauging means mounted on said presser foot for engaging the crotch of said vent and thus positioning said sleeve with said vent in proper stitching position; a support mounted on said machine bed in back of said presser foot for supporting an end portion of said sleeve; a stationary transverse cutting member mounted on said machine bed adjacent to said support; movable clamping means for clamping said end portion of said sleeve to said support adjacent said open end of said vent, said clamping means mounted on said machine bed movably between releasing position spaced from said support and clamping position pressing said end portion of said sleeve against said support; and a movable cutting member for trimming by co-action with said stationary cutting member said end portion of said sleeve, said cutting member mounted on said machine bed movably between non-operative and operative positions.

13. In apparatus of the character described including a sewing machine having a machine bed, a presser foot and associated stitching mechanism, in combination, gauging means mounted on said presser foot for positioning a portion of a garment in proper stitching position; a carrier member mounted on said machine bed in back of said presser foot and slidably in a horizontal plane; means for securing said carrier member in adjusted position to said machine bed; a support mounted on said carrier member also in back of said presser foot for supporting another portion of said garment while said first garment portion is held by said presser foot in proper stitching position determined by said gauging means; a stationary cutting member mounted on said carrier member adjacent to said support; movable clamping means for clamping said other portion of said garment to said support, said clamping means mounted on said carrier member movably between releasing position spaced from said support and clamping position pressing said other portion of said garment against said support; a movable cutting member for cutting by co-action with said stationary cutting member said other portion of said garment, said cutting member mounted on said carrier member movably between non-operative and operative positions; guard means mounted on said movable clamping means movable together with the same so as to prevent access to the cutting edges of said cutting members while said clamping means are in clamping position; first interlocking means permitting movement of said movable cutting members from non-operative into operative position only while said movable clamping means are in clamping position; second interlocking means permitting movement of said movable clamping means for clamping into releasing position only while said movable cutting member is in non-operative position; and spring means combined with said movable cutting member permanently tending to move the same from operative into non-operative position.

14. In apparatus of the character described including a sewing machine having a machine bed, a presser foot and associated stitching mechanism, in combination, gauging means mounted on said presser foot for positioning a portion of a garment in proper stitching position; a carrier member mounted on said machine bed in back of said presser foot and slidably in a horizontal plane; means for securing said carrier member in adjusted position to said machine bed; a support mounted on said carrier member also in back of said presser foot for supporting another portion of said garment while said first garment portion is held by said presser foot in proper stitching position determined by said gauging means; a stationary cutting member mounted on said carrier member adjacent to said support; movable clamping means for clamping said other portion of said garment to said support, said clamping means mounted on said carrier member movably between releasing position spaced from said support and clamping position pressing said other portion of said garment against said support; a movable cutting member for cutting by co-action with said stationary cutting member said other portion of said garment, said cutting member mounted on said carrier member movably between non-operative and operative positions; and guard means mounted on said movable clamping means movable together with the same so as to prevent access to the cutting edges of said cutting member while said clamping means are in clamping position.

15. In apparatus of the character described including a sewing machine having a machine bed, a presser foot and associated stitching mechanism, in combination, gauging means mounted on said presser foot for positioning a portion of a garment in proper stitching position; a carrier member mounted on said machine bed in back of said presser foot and slidably in a horizontal plane; means for securing said carrier member in adjusted position to said machine bed; a support mounted on said carrier member also in back of said presser foot for supporting another portion of said garment while said first garment portion is held by said presser foot in proper stitching position determined by said gauging means; a stationary cutting member mounted on said carrier member adjacent to said support; movable clamping means for clamping said other portion of said garment to said support, said clamping means mounted on said carrier member movably between releasing position spaced from said support and clamping position pressing said other portion of said garment against said support; and a movable cutting member for cutting by co-action with said stationary cutting member said other portion of said garment, said cutting member mounted on said carrier member movably between non-operative and operative positions.

16. In apparatus of the character described including a sewing machine having a machine bed, a presser foot for holding a portion of a garment and associated stitching mechanism, in combination, a carrier member mounted on said machine bed in back of said presser foot and slidably in a horizontal plane; means for securing said carrier member in adjusted position to said machine bed; a support mounted on said carrier member also in back of said presser foot for supporting another portion of said garment while said first garment portion is held by said presser foot; a stationary cutting member mounted on said carrier member adjacent to said support; movable clamping means for clamping said other portion of said garment to said support, said clamping means mounted on said carrier member movably between releasing position spaced from said support and clamping position pressing said other portion of said garment against said support; a movable cutting member for cutting by co-action with said stationary cutting member said other portion of said garment, said cutting member mounted on said carrier member movably between non-operative and operative positions; guard means mounted on said movable clamping means movable together with the same so as to prevent access to the cutting edges of said cutting members while said clamping means are in clamping position; first interlocking means permitting movement of said movable cutting member from non-operative into operative position only while said movable clamping means are in clamping position; and second interlocking means permitting movement of said movable clamping means from clamping into releasing position only while said movable cutting member is in non-operative position.

17. In apparatus of the character described including a sewing machine having a machine bed, a presser foot for holding a portion of a garment and associated stitching mechanism, in combination, a carrier member in back of said presser foot mounted on said machine bed slidably in a horizontal plane; means for securing said carrier member in adjusted position to said machine bed; a support mounted on said carrier member also in back of said presser foot for supporting another portion of said garment while said first garment portion is held by said presser foot; a stationary cutting member mounted on said carrier member adjacent to said support; movable clamping means for clamping said other portion of said garment to said support, said clamping means mounted on said carrier member movably between releasing position spaced from said support and clamping position pressing said other portion of said garment against said support; and a movable cutting member for cutting by co-action with said stationary cutting member said other portion of said garment, said cutting member mounted on said carrier member movably between non-operative and operative positions.

18. In apparatus of the character described comprising a sewing machine having a bed, a presser foot and associated stitching mechanism, in combination, gauging means associated with said presser foot for positioning a portion of a sleeve in proper stitching position; a support mounted on said bed in back of and spaced from said presser foot for supporting an end portion of said sleeve while said first sleeve portion is held by said presser foot in proper stitching position determined by said gauging means; movable clamping means associated with said support for clamping said end portion of said sleeve to said support; and manually operable cutting means mounted on said bed and associated with said support and said clamping means for trimming said end portion of said sleeve while clamped by said clamping means to said support.

19. In apparatus of the character described for forming a row of stitches near the crotch of a vent in transverse direction to said vent including a sewing machine having a stitching mechanism and a feed mechanism movable in said transverse direction, in combination, a lower clamping member; an opposite releasable upper clamping member, both of said clamping members forming part of said apparatus and mounted for movement in unison by said feed mechanism in said transverse direction; and an elongated resilient U-shaped gauging member having two parallel legs and secured at the free end of one of said legs to said upper clamping member and extending with its other leg in said transverse direction in a plane between said clamping members so that said other leg of said gauging member is adapted to engage the crotch of said vent and hold the same in proper stitching position.

BENJAMIN LIEBOWITZ.

REFERENCES CITED

The following references are of record in the file of this patent:

UNITED STATES PATENTS

| Number | Name | Date |
|---|---|---|
| 1,286,113 | Robinson | Nov. 26, 1918 |
| 1,463,262 | Gray | July 31, 1923 |